Nov. 13, 1951 — R. N. BAUGH ET AL — 2,575,156
FISHING REEL
Filed March 17, 1947
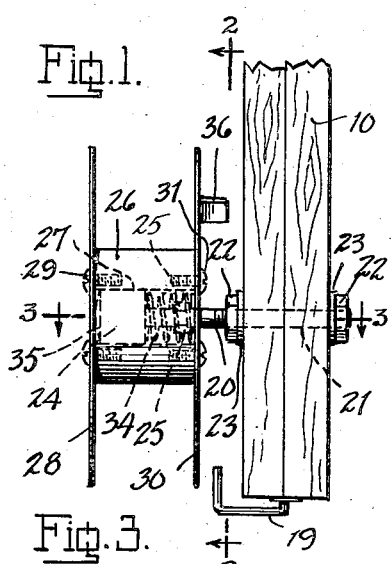
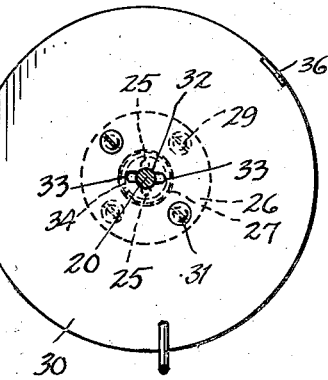
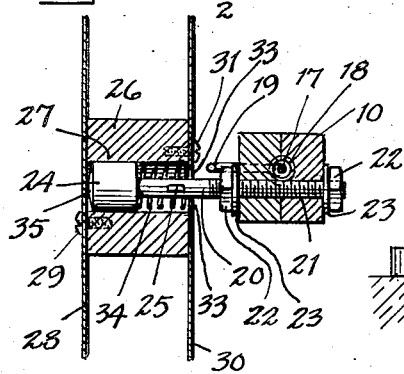
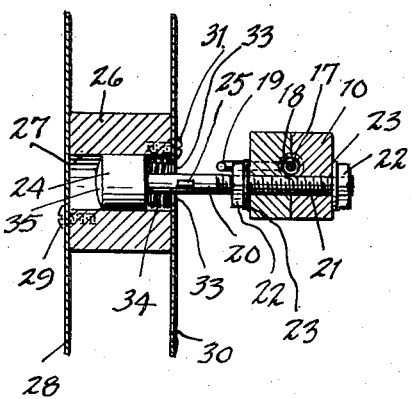
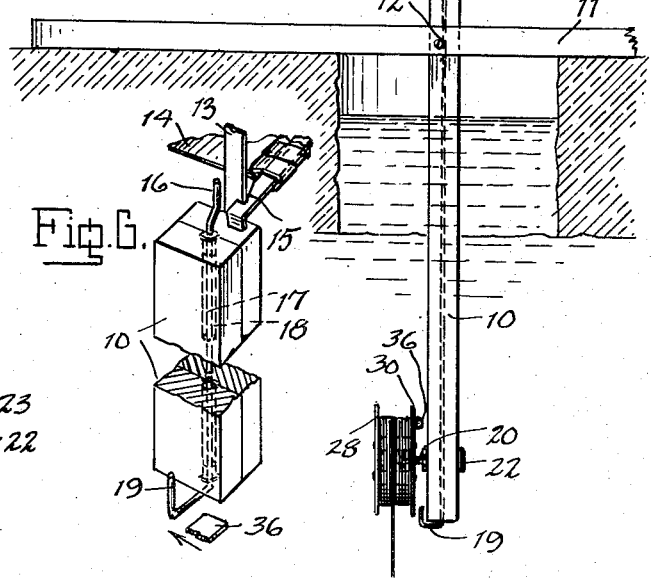
INVENTORS.
RAYMOND N. BAUGH AND
ROBERT F. WYCINOWSKI
BY
ATTORNEY.

Patented Nov. 13, 1951

2,575,156

UNITED STATES PATENT OFFICE 2,575,156

FISHING REEL

Raymond N. Baugh, Bridgeport, and Robert F. Wycinowski, Fairfield, Conn.; said Wycinowski assignor to said Baugh Application March 17, 1947, Serial No. 735,264

4 Claims. (Cl. 242—109)

1

The present invention relates to a fishing reel, particularly for use with ice fishing tip-ups, or similar fishing apparatus wherein signal means are provided to be effectuated through rotation of the reel, as a fish takes the bait. Such reels, employed for this purpose, are usually of free-running type, and where small live bait is employed for catching relatively small fish, the strength of the bait in swimming about at the end of the line, is insufficient to rotate the reel and trip the signal. However, when catching relatively big fish, the live bait employed is usually of such size and strength that it will exert sufficient pull on the line, as it moves about, to rotate the free-running reel and trip the signal.

Reels have been used heretofore in which a drag or tension could be put on the reel to resist its turning, the tension being thereupon manually decreased or increased as desired by the fisherman after the fish has taken the bait and started to run with it. This practice is objectionable as it is highly desirable that when the fish to be caught takes the bait the reel be free-running, so that the fish will be permitted to run with the bait without appreciable resistance of the reel.

It is an object of the present invention to provide a reel, which is normally free-running and having means whereby in the case of using relatively large live bait, a resistance may be applied to the turning of the reel, which is sufficient to prevent the bait from rotating the reel and tripping the signal, but is such as to permit the fish being caught to rotate the reel without any appreciable resistance as it takes the bait. It is further proposed to provide such resistance means which will automatically release as soon as the reel is rotated through the pull of the fish taking the bait, the rotation in the disclosed embodiment of the invention being in the order of less than 180° of rotation. A further object is to provide such resistance applying means, which will not interfere with the normal free-running of the reel.

A further object is to provide a reel having resistance applying means which may be conveniently operated simply by grasping the reel and imparting axial movement to it to set the resistance applying means, thus dispensing with the necessity of handling or manipulating small or delicate parts. This is especially important in ice fishing, where the fisherman's hands are usually encumbered by heavy gloves.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a side elevation of the reel, according to the illustrated exemplary embodiment of the invention, the shaft being shown attached to the lower end of an ice fishing tip-up.

Fig. 2 is a vertical sectional view, taken along the line 2—2 of Fig. 1.

Fig. 3 is a horizontal sectional view, taken along the line 3—3 of Fig. 1.

Fig. 4 is a horizontal sectional view showing the reel in its set position to apply resistance to its turning movement.

Fig. 5 is a side elevation showing the tip-up provided with the reel, according to the invention, the tip-up being shown in its operative position supported through a hole in the ice, the signal member being shown in full lines in its set position, and in dot-and-dash lines in its released position.

Fig. 6 is an enlarged perspective view, with intermediate parts broken away, showing the upper and lower ends of the reel supporting member of the tip-up, and showing the spring strip signal member in its set position.

Similar reference characters indicate corresponding parts throughout the several figures of the drawings.

Referring to the drawings, the fishing reel, according to the illustrated exemplary embodiment of the invention, is illustrated as attached to the lower end of the reel supporting member 10 of the ice fishing tip-up, the tip-up illustrated being of the type disclosed in our co-pending patent application for Tip-up for Ice Fishing, Serial No. 713,946, which issued on August 31, 1948 as Patent No. 2,448,346, filed December 2, 1946.

It will be understood that the reel may be applied to any suitable type of tip-up structure wherein rotation of the reel trips, or otherwise releases, a signal device. In the tip-up illustrated, the reel supporting member 10 is pivotally connected to a supporting member 11 by means of a pivot screw 12, the member 11 adapted to rest on the surface of the ice in bridging relation to the hole in the ice, while the member 10 extends downwardly into the water. The member 10 carries at its upper end an elongated strip 13, of steel, or other suitable material, carrying a signal flag 14, this strip adapted in its set position to be held in loop form by means of a notch 15 engaged with the upright portion of the strip, as shown clearly in Fig. 6. The notched end of the strip projects into the path of a crank arm 16 provided at the upper end of a crank rod 17 rotatably disposed in a bearing hole 18 extending lengthwise through the member 10, this crank rod being provided at its lower end with a crank arm 19 adapted to be disposed in the path of a tripping lug provided upon the reel. Thus, upon rotation of the reel, the crank arm 19 is engaged by the lug to cause the crank rod to be rotated, whereupon the crank arm 16 at its upper end disengages the notched end of the strip member, allowing it to spring to its vertical signalling position, as indicated by the dot-and-dash lines in Fig. 5.

The reel, according to the invention, comprises a shaft 20 having a screw threaded portion engaged through a transverse hole 21 in the tip-up member 10 and rigidly secured thereto by nuts 22—22 and lock washers 23—23 engaged at each side of the tip-up member. The shaft projects at one side of the tip-up member, and is provided at its end with a cylindrical head 24, and in inwardly spaced relation to the head with a pair of radially projecting lugs 25—25. These lugs may be formed in any suitable manner, as for instance by pinching out the metal of the shaft, by a cross-pin provided in the shaft, or in any other suitable way.

The reel consists of a cylindrical hub 26 having a cylindrical bore 27 slidably fitted upon the head 24 of the shaft. An outer side plate 28 is secured to the outer end of the hub by screws 29, its center portion closing the outer end of the bore 27. An inner side plate 30 is secured to the inner end of the hub by means of screws 31, and is provided with a center bearing hole 32 having bearing engagement with the shaft 20 and having oppositely extending radial notches 33, which are of such size as to permit the lugs 25 of the shaft to pass freely through them.

A helical compression spring 34 is provided in the bore of the hub of the reel, between the inner face of the head 24 and the inner side of the side plate 30, being of sufficient diameter so that the lugs 25 of the shaft are out of contact therewith. This spring normally presses the reel inwardly, so that the outer end of the head 24 contacts the side plate 28. The end surface of the head is preferably rounded, as at 35, so that it engages the plate 28 with minimum point contact, thus minimizing frictional resistance to the free running of the reel. The lugs 25 are so positioned upon the shaft that, in this inwardly moved position of the reel, they are within the bore of the hub 26 and spaced from the plate 30 so that there is no interference with the free-running of the reel. The projection of the notches 33 beyond the shaft is such that their outer ends are inwardly spaced from the bore 27 of the hub a sufficient distance, so that the end of the spring in contact with the plate 30 engages a continuous circumferential surface and, therefore, permits the free-running of the reel, without any chance of the spring catching into the notches 33.

Upon the periphery of the side plate 30 there is provided a projecting lug 36 adapted upon rotation of the reel to engage and swing the crank arm 19 to trip the signal of the tip-up.

It is pointed out that in the normal free-running position of the reel, the spring 34 is under very light tension sufficient only to maintain the reel in its inwardly moved position, as shown in Figs. 1 to 3, without, however, imposing any appreciable frictional resistance to its free running. This is the operative position of the reel when the line is baited with relatively small live bait, the strength of such bait being insufficient to impart rotation to the reel. When a fish takes the bait and runs with it, the reel is rotated, causing the tip-up signal to be actuated. In the case of using relatively large live bait, which would have sufficient strength to cause rotation of the free-running reel, the reel is set, as shown in Fig. 5, by pulling it outwardly upon the head 24 of the shaft, so that the lugs 25 are passed through the notches 33 of the side plate 30, the reel being thereupon slightly turned to engage the lugs with the outer surface of the side plate in offset relation to the notches. The spring is thus compressed so that substantial frictional resistance is set up between the lugs and the side plate 30, this resistance being sufficient to prevent rotation of the reel by the relatively large live bait. As soon as a fish takes the bait and starts to run with it, the reel is rotated, and as the notches 33 come into register with the lugs 25 the spring presses the reel inwardly so that the lugs pass through the notches to their normal position within the bore of the hub. The reel is then free-running, and being in its inwardly moved position disposes the lug 36 in operating position to engage the crank arm 19 to trip the signal during the initial rotation of the reel.

We have illustrated and described a preferred and satisfactory embodiment of the invention, but it will be understood that changes may be made therein within the spirit and scope thereof, as defined in the appended claims.

What is claimed is:

1. In a fishing reel, a shaft, a reel rotatable on said shaft, releasable rotation resisting means cooperating with said reel, and adapted to resist rotation of said reel relative to said shaft, and means carried by said reel adapted at a given point in a single rotation of said reel in either direction to release said rotation resisting means.

2. In a fishing reel, a shaft, a reel rotatable upon said shaft and having axial movement thereon, spring means cooperating between said shaft and reel adapted to be placed under stress through axial movement of said reel in one direction, rotation resisting retaining means cooperating between said shaft and reel adapted to releasably retain said reel in said axially moved position under action of said spring means, and means carried by said reel adapted upon rotation of said reel to release said retaining means.

3. In a fishing reel, a shaft, a reel rotatable upon said shaft and having outward axial movement thereon from a normal inward position, spring means cooperating between said shaft and reel normally maintaining said reel in said inward position and adapted to be placed under stress through axial movement of said reel in outward direction, retaining rotation resisting means cooperating between said shaft and reel adapted to retain said reel in said outward axially moved position under action of said spring means, and means carried by said reel adapted upon rotation of said reel to release said retaining means.

4. In a fishing reel, a shaft having a cylindrical head, a reel having an axial bore rotatably engaged by said head and having outward axial movement thereon from a normal inward position, closure means for the inner end of said bore having a bearing hole therein through which said shaft extends, a helical spring disposed within said bore between said head and said closure means exerting inward pressure on said reel, and projecting lug means carried by said shaft normally disposed within said bore, said bearing hole having notch means permitting passage of said lug means to the outer side of said closure means upon outward axial movement applied to said reel to compress said spring, said lug means being adapted to engage the outer surface of said closure means in angular offset relation to said notch means under the pressure of said spring to frictionally resist rotation of said reel, said lug means being adapted to pass through said notch means under the expanding pressure of said spring upon rotation of said reel to bring said notch means into register with said lug means.

RAYMOND N. BAUGH.
ROBERT F. WYCINOWSKI.

REFERENCES CITED

The following references are of record in the file of this patent:

UNITED STATES PATENTS

| Number | Name | Date |
|---|---|---|
| 1,566,594 | Graham | Dec. 22, 1925 |
| 2,008,555 | Kovane | July 19, 1935 |
| 2,114,529 | Goodhue | Apr. 19, 1938 |
| 2,195,356 | Biddinger | Mar. 26, 1940 |
| 2,448,346 | Baugh et al. | Aug. 31, 1948 |

FOREIGN PATENTS

| Number | Country | Date |
|---|---|---|
| 481,030 | Great Britain | Mar. 4, 1938 |